US011062145B2

(12) United States Patent
Ellerhold et al.

(10) Patent No.: US 11,062,145 B2
(45) Date of Patent: Jul. 13, 2021

(54) CAMERA DEVICE FOR THE EXTERIOR REGION OF A BUILDING

(71) Applicant: Robert Bosch GmbH, Stuttgart (DE)

(72) Inventors: Christian Ellerhold, Neubiberg (DE); Rainer Bauereiss, Baiersdorf (DE); Ralph Bergmann, Neubeuern (DE); Rene van Gils, Berkel-Enschot (DE); Stefan Wallner, Baldham (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 15/487,823

(22) Filed: Apr. 14, 2017

(65) Prior Publication Data

US 2017/0300760 A1    Oct. 19, 2017

(30) Foreign Application Priority Data

Apr. 15, 2016   (DE) .................... 10 2016 206 361.8

(51) Int. Cl.
*G06K 9/00*    (2006.01)
*H04N 5/225*    (2006.01)
(Continued)

(52) U.S. Cl.
CPC ....... *G06K 9/00771* (2013.01); *G06K 9/2063* (2013.01); *G08B 13/19606* (2013.01);
(Continued)

(58) Field of Classification Search
None
See application file for complete search history.

(56) References Cited

U.S. PATENT DOCUMENTS

| 5,661,817 A * | 8/1997 | Hatlestad ........... G06K 9/00657 |
| | | 348/144 |
| 2010/0110212 A1* | 5/2010 | Kuwahara .............. H04N 5/232 |
| | | 348/222.1 |

(Continued)

FOREIGN PATENT DOCUMENTS

| CN | 102209232 A | 10/2011 |
| CN | 102955937 A | 3/2013 |

(Continued)

OTHER PUBLICATIONS

Screen captures from YouTube video clip entitled "How to Set Up My Broadcaster Camera", 7 pages, uploaded on Feb. 28, 2013 by user logitechsupport. Retrieved from Internet: <https://www.youtube.com/watch?v=DYwmLBWsk5Y> (Year: 2013).*

(Continued)

*Primary Examiner* — James M Anderson, II
(74) *Attorney, Agent, or Firm* — Michael Best & Friedrich LLP

(57) ABSTRACT

A camera system for the exterior region of a building,
comprising a camera for producing image data of surroundings of the camera system,
comprising a network module for connecting the camera system to a data network,
contains an evaluation module configured to carry out the following from a predeterminable start time to an end time:
detect a code pattern in the image data, and
detect an authorization code and access data for the data network in a detected code pattern, and
check a detected authorization code in respect of the validity thereof, and
(Continued)

log the camera system onto the data network with the access data in the case of a valid authorization code and setting a successful log on time as end time.

20 Claims, 2 Drawing Sheets

(51) Int. Cl.

| | | |
|---|---|---|
| *H04W 12/08* | (2021.01) | |
| *G06K 9/20* | (2006.01) | |
| *G08B 13/196* | (2006.01) | |
| *H04L 29/06* | (2006.01) | |
| *H04W 12/50* | (2021.01) | |
| *H04N 7/18* | (2006.01) | |
| *H04W 84/12* | (2009.01) | |
| *H04W 12/77* | (2021.01) | |
| *H04R 27/00* | (2006.01) | |

(52) U.S. Cl.
CPC . *G08B 13/19619* (2013.01); *G08B 13/19695* (2013.01); *H04L 63/10* (2013.01); *H04N 5/2252* (2013.01); *H04N 5/2256* (2013.01); *H04N 7/183* (2013.01); *H04N 7/188* (2013.01); *H04W 12/08* (2013.01); *H04W 12/50* (2021.01); *G08B 13/19632* (2013.01); *H04L 63/083* (2013.01); *H04R 27/00* (2013.01); *H04W 12/77* (2021.01); *H04W 84/12* (2013.01)

(56) References Cited

U.S. PATENT DOCUMENTS

| | | | | |
|---|---|---|---|---|
| 2010/0128123 | A1 | 5/2010 | DiPoala | |
| 2012/0274784 | A1* | 11/2012 | Hofman | G06K 9/209 |
| | | | | 348/169 |
| 2013/0049610 | A1* | 2/2013 | Chen | H05B 45/37 |
| | | | | 315/159 |
| 2013/0141587 | A1* | 6/2013 | Petricoin, Jr. | G07C 9/00111 |
| | | | | 348/156 |
| 2014/0334676 | A1* | 11/2014 | Skans | G06K 9/6201 |
| | | | | 382/103 |
| 2015/0022666 | A1* | 1/2015 | Kay | H04L 67/025 |
| | | | | 348/159 |
| 2015/0070494 | A1* | 3/2015 | Hess, Jr. | H04N 17/002 |
| | | | | 348/143 |
| 2015/0092054 | A1* | 4/2015 | Saptharishi | H04N 7/181 |
| | | | | 348/143 |
| 2015/0188896 | A1* | 7/2015 | Slick | H04L 63/0428 |
| | | | | 713/171 |
| 2017/0238235 | A1* | 8/2017 | Keidar | H04W 48/02 |
| | | | | 370/338 |

FOREIGN PATENT DOCUMENTS

| | | |
|---|---|---|
| CN | 105119931 A | 12/2015 |
| WO | 2015104650 A2 | 7/2015 |

OTHER PUBLICATIONS

Bani-Hani et al., Secure QR Code System, Dec. 18, 2014, IEEE, 2014 10th International Conference on Innovations in Information Technology (IIT), pp. 1-6. (Year: 2014).*

YouTube video clip "Getting Started with the YI Home Camera", uploaded Dec. 20, 2015 by user YI Technology, Retrieved from the Internet <https://www.youtube.com/watch?v=DBMTBlzR_lo>(Year: 2015) (Year: 2015).*

"New YI Home Camera takes on Nest Cam for less than half the price", webpage, BGR, published Dec. 7, 2015, https://bgr.com/2015/12/17/yi-home-camera-price-order-info/, (2 pages).

* cited by examiner

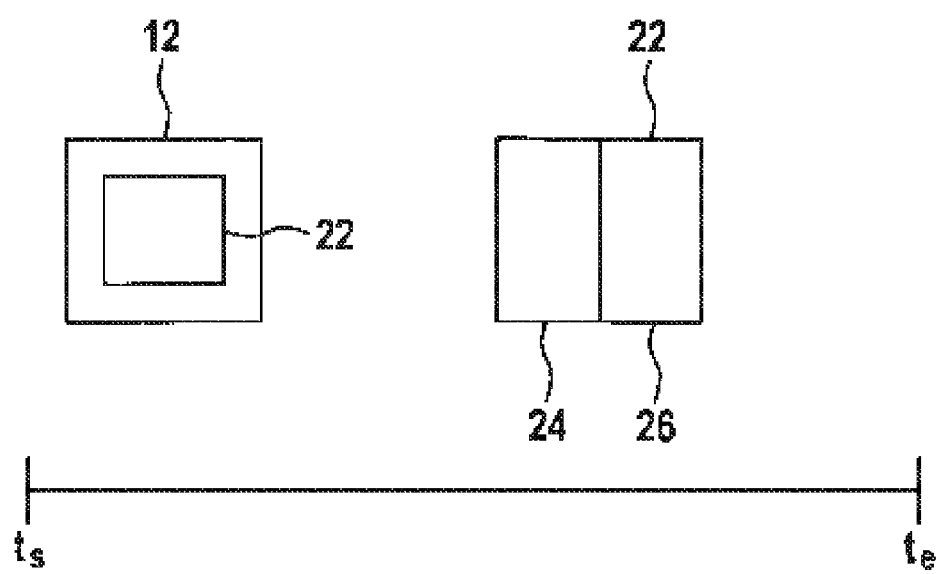

CAMERA DEVICE FOR THE EXTERIOR REGION OF A BUILDING

BACKGROUND OF THE INVENTION

The invention relates to a camera device for the exterior region of a building.

Exterior cameras for monitoring buildings are known.

US 2010/0110212 A1 has disclosed a camera appliance, in which setting information is converted into multiplicity of image patterns and the multiplicity of image patterns are displayed in a temporal sequence in accordance with a predetermined sequence. The camera appliance reproduces the setting information from the image information recorded by the camera appliance by way of recording the displayed description in order to set the setting information therein.

US 2010/0128123 A1 has disclosed a security system containing a video system for recording images of an intruder. The video system contains video motion detection technology which tracks a moving thief and moves a pan-tilt-zoom camera in order to keep the thief in the field of view.

SUMMARY OF THE INVENTION

A camera device is proposed within the scope of the invention. Preferred or advantageous embodiments of the invention, and other invention categories, emerge from the claims, the following description and the attached figures.

Hence, the subject matter of the invention is a camera device for the exterior region of a building. The camera device contains a camera. The camera serves to produce image data of surroundings of the camera device. Thus, the surroundings of the camera device captured by the camera are imaged in the form of image data or an image. The camera device contains a network module. The network module serves to connect the camera device to a data network. The camera device contains an evaluation module. The evaluation module is configured to carry out the following from a predeterminable start time to an end time to be determined:

Detecting a code pattern in the image data. Should a code pattern be detected, detecting an authorization code and access data for the data network in such a detected code pattern. In particular, furthermore also detecting information preventing unauthorized access to the local camera and an ID number, by means of which the camera can uniquely be identified in the local network. Should an authorization code be detected, checking such a detected authorization code in respect of the validity thereof. Should the authorization code be found to be valid, i.e. in the case of a valid authorization code, logging the camera device onto the data network with the access data and setting a successful log on time of the camera device to the data network as end time.

In particular, the building is a building with smart-home technology or a smart home. This means that a plurality or a multiplicity of appliances and components in and on the building are connected, using data technology, by users of the building, etc., or communicate among themselves. In particular, the data network is a wireless network, in particular a Wi-Fi or WLAN network. The expression "detecting" a code pattern, etc., should be understood to mean: searching for whether a corresponding code pattern, etc., is locatable or recognizable and, in the affirmative, recognizing it, decoding it, providing it as a data record, etc. In particular, the start time is a time from which the camera device is supplied with energy, for example connected to an energy supply network. However, the start time may also be a boot-up time of an internal computing device or internal electronics of the camera device, a reset time for a corresponding computing device, etc. In particular, a code pattern is a QR code which, in particular, is displayed on a display of an electrical appliance. In particular, the electrical appliance is a smartphone, the display of which is then held in front of the camera such that the camera produces image data of the objects displayed on the display of the smartphone. In particular, the access data are a Wi-Fi or WLAN-SSID and/or a password and/or user identification. In particular, no real user identification within the actual meaning of the phrase is transferred in the QR code. The assignment to a user account is then carried out by communication between camera, app and backend.

In particular, a challenge-response method is further provided or carried out in order to prevent communication from being recorded with fake terminals.

In accordance with the invention, an advantage arising is that the camera or the camera device may be logged onto the data network in a particularly simple manner, namely by presenting the code pattern in such a way that it may be recorded in the form of image data by the camera. An authorization code in the code pattern protects against an unauthorized supply of access data to the camera device or the processing of unauthorized access data. In accordance with the invention, furthermore, the definition of an end time after successful logging on allows no further logging on as the end time has been exceeded, and the claimed steps are no longer possible thereafter. The same applies to the presentation of the code pattern, etc., prior to the start time. Here too, there is no appropriate processing and also no logging onto the data network. Logging onto the data network and/or processing of presented code patterns for logging onto the data network is therefore only possible in the time interval between start time and end time.

The camera device is suitable for use in the exterior region of a building. Preferably, the camera device is designed at least to meet the protection type IP 23 (international protection) and/or at least to be protected against spraying water IP x3. Particularly preferably, the camera device is designed at least to meet the protection type IP 44 and/or at least to be protected against splashing water IPx4. In particular, the camera device is designed at least to meet the protection type IP 65 and/or at least to be protected against water jets IP x5 and/or at least to have IP x7 protection.

In a preferred embodiment, the evaluation module is configured to set a restart time of the camera device as start time. This relates to a restart of e.g. an internal computing device or internal electronics in the camera device. In particular, the time of the restart is the aforementioned boot-up time or reset-time, i.e. a time at which an internal computing device etc. in the camera device is restarted or reset. In particular, this ensures that the network log on according to the invention is facilitated from the restart of the camera device.

In a preferred embodiment, the evaluation module is configured to set a log off time from a previously connected data network as start time and then, from this start time on, only to accept the authorization code which was transmitted for the preceding successful log on onto the data network. Hence, this ensures that a renewed log on is facilitated after a log off from a previously connected data network. The restriction to the specific authorization code used for the preceding log on prevents a renewed connection to a data network using different authorization codes.

In particular, the camera moreover permits regular changes of authorization codes to ensure that a code which may have inadvertently become known (photographing the QR code) is not used in an unauthorized manner.

In particular, the scanning of the QR code may be activated on the camera at any time—as long as it is online and connected to the backend—in order to permit a change of the network.

In a preferred embodiment, the camera device contains a first light source. The first light source serves to produce target lighting in the surroundings of the camera device. A target is any object or region in the surroundings of the camera device, e.g. a footpath or drive, space, etc. This target should predominantly be illuminated by the light source. The camera device therefore constitutes a combination of exterior light and exterior camera. Hence, any lighting object may be achieved by the first light source, in particular, however, the illumination of regions which are to be monitored by the camera, e.g. access or approach paths to a building.

In a preferred embodiment, the camera device contains a second light source. The second light source serves to produce ambient lighting in the surroundings of the camera device. Ambient lighting serves to produce light effects, optically appealing illumination, e.g. on house walls etc., and less to produce the target lighting of the target region in the surroundings of the camera device. By way of example, when installed on the wall of a building, there is a wall plane in the case of an intended assembly of the camera device in a specific assembly position, with the building wall lying in said wall plane. By way of example, the ambient lighting is then designed in such a way that a specific wall region is illuminated. Lighting of the house wall in the upward and/or downward direction is particularly optically appealing. In any event, the surroundings are illuminated indirectly by reflection of the light from the second light source on the house wall.

For both of the alternatives just mentioned, which comprise a first light source and/or a second light source, a camera device which is predominantly designed as an exterior light for a building, or which serves as such, also emerges, and so the camera is actually more likely to offer a secondary functionality in addition to the illumination.

In a preferred embodiment of the invention, the camera device contains a motion detector. The motion detector serves to detect a movement of an object in the surroundings of the camera device. In the case of an appropriate detection, a wide range of measures may be taken; by way of example, the camera may be activated for recording images and/or—particularly in the case of darkness—the first light source and/or the second light source may be put into operation. By way of example, this may scare off and/or allow observation of unauthorized persons in the surroundings of the camera device.

Therefore, in a preferred variant of this embodiment, the evaluation module is configured to start producing image data in the case of a detection of a movement as outlined above. By way of example, this renders it possible to record image data of the persons in the case of a movement of unauthorized persons in the surroundings of the camera device, for example in order to facilitate securing of evidence. In particular, for this purpose, the first and/or second light sources, if present, are also switched on account of the detection of movement, especially at night, in order to obtain a sufficient image quality when producing image data, even in darkness.

In a preferred embodiment, the evaluation module contains an interface to a counterpart, in particular a corresponding program. Any desired component of the camera device, e.g. the camera or the evaluation module, is connected to the counterpart by way of the data network. By way of example, the counterpart is software, an Internet site, a smartphone app or the like, which facilitates communication with the camera device. By way of example, the communication is the activation or deactivation of individual components such as the camera and light sources, a status query, a transmission of image and sound signals, etc.

In a preferred embodiment, the camera device contains a loudspeaker and/or a microphone. By way of example, alert messages or announcements may be output by the camera device by way of a loudspeaker. The microphone may be used to record or archive noises from the surroundings of the camera device, transmit said noises to the data network or transfer said noises to the aforementioned counterpart—if available.

In a preferred variant of this embodiment, the evaluation module is configured to bring about an intercom function from the surroundings to a counterpart with the aid of the loudspeaker and the microphone (both are present in this case). Once again, the counterpart is reachable by way of e.g. the data network and, for example, is formed or made available by the corresponding program. Thus, in particular, an intercom functionality of the camera device has to be implemented in order to bring about conversation between a person in the surroundings of the camera device and a second person in the form of a user of the counterpart via the data network.

In a preferred embodiment, the camera device contains a motion detector. The latter serves to detect a movement of an object in the surroundings of the camera device. Here, no IVA (integrated video analysis) is provided in one possible embodiment, i.e. a real object detection is not possible. The camera device contains an evaluation module configured to detect a movement of an object in the surroundings of the camera device on the basis of a program-technical motion detection in the image data. The program-technical motion detection is carried out within the scope of an analysis of the content of the image data.

Thus, in accordance with the embodiment, two different alternatives for detecting the movement of an object are possible: the motion detector and the program-technical motion detection. Both variants may be used either as alternatives or together. A wide range of measures may be taken by the evaluation module in the case of a successful detection of a movement. By way of example, an available light may be switched on in order to illuminate the surroundings of the camera device. In particular, the motion detector is a PIR sensor (passive infrared sensor). The two sensors may complement one another in order to detect movements more reliably than in the case of only a single sensor. Different capturing concepts of the movement detection of the sensor and the image processing may complement one another. Recognizing a movement may trigger a follow-up action, for example storing recorded image data or forwarding the latter, but also live transmissions to a counterpart, e.g. an app on a smartphone, or triggering of an alarm.

In a preferred embodiment, the evaluation module is configured to activate the production of image data when the motion detector detects a movement. Here, the motion detector is initially ready or in monitoring operation in order to identify a movement. Only once the movement has been identified in principle is the camera activated in order to produce image data. Then, there may also take place, either alternatively or additionally, the program-technical motion detection. This avoids continuous operation of the camera.

In a preferred embodiment, the evaluation module is configured to validate a detection of movement by the motion detector on the basis of the program-technical motion detection. By way of example, this renders it possible to check whether a movement has actually occurred, at least in the visual field of the camera, or whether this was an erroneous trigger of the motion detector.

In a preferred embodiment, the evaluation module is configured to carry out the validation on the basis of an identification of a moving object in the image data and a classification of the object as relevant or irrelevant. Should the case arise that a moving object is in actual fact detected in the image data, it is thus possible to check the class of the object. By way of example, moving humans, animals or plants may be distinguished. In particular, the distinction is carried out only on the basis of the size and not on the basis of the object itself. Thus, it is also possible to make a decision as to whether the movement is relevant for a specific follow-up reaction of the evaluation module. By way of example, there is no need to trigger an intruder alarm in the case of a movement of a pet or a tree.

In a preferred embodiment, the evaluation module is configured to carry out the classification of the object as relevant or irrelevant depending on a region of the surroundings in which the object is detected. In particular, the region of the surroundings may be determined by a region in the image data. Thus, for example, it is possible to define a surrounding region of the camera device in which moving small animals do not trigger an alarm or a reaction of the system. Thus, there is a so-called small animal suppression in said region.

In a preferred embodiment, the evaluation module is configured to carry out a storage of image data and/or a transfer of image data to a counterpart should a movement be detected. Here, the detection may once again be carried out by the motion detector and/or the program-technical motion detection. A user is able to observe the image data after storage or at the counterpart, possibly live or at a later time, and receives information about the events in the surroundings of the camera device. By way of example, the counterpart is e.g. a smartphone or a corresponding app.

In a preferred embodiment, the camera device contains a first light source which serves to produce target lighting in the surroundings of the camera device and/or the camera device contains a second light source which serves to produce ambient lighting in the surroundings of the camera device. For both of the mentioned alternatives, which comprise a first light source and/or a second light source, a camera device which is predominantly designed as an exterior light for a building, or which serves as such, emerges in particular, and so the camera is actually more likely to offer a secondary functionality in addition to the illumination.

In a preferred variant of this embodiment, the evaluation module is configured to activate the first light source and/or second light source should a movement be detected. In particular, the light source is switched on in the process, in particular only if a movement of a relevant object was detected.

In a preferred variant of this embodiment, the evaluation module is embodied in such a way that a schedule for the operation of the first light source and/or second light source may be set and/or that the operation of the first light source and/or second light source depends on a brightness value of ambient light, wherein the brightness value is ascertained by an ambient light sensor of the camera. In particular, the schedule is independent of a motion detection. By way of example, the schedule may be influenced by way of a data network or an app. By virtue of the operation being dependent on the ambient light, it is possible to avoid that, for example, the light sources shine pointlessly during the day, when the surroundings are illuminated by daylight in any case. In particular, an ambient light sensor present in the camera may be used for determining the ambient light. By identifying the ambient light, it is possible, for example, to adapt switching on and off times of the light sources over the course of the seasons, depending on the times at which it becomes light or dark at any given time.

In a preferred variant of this embodiment, the evaluation module is configured to dim the first light source and/or second light source. Hence, it is possible to adapt the brightness of the light from the light sources over several steps, or in a continuous fashion, to the desired illumination situation. By way of example, dimming is once again carried out by way of a data network or an app.

Embodiments of the invention, also in combination of the aforementioned embodiments, optionally also embodiments not mentioned previously, are summarized as follows:

In accordance with the invention, a smart home exterior camera with extended software features and system features emerges. The proposed camera device is a combination of an exterior light, envisaged for illuminating paths or drives, of ambient illumination which serves to provide indirect light on house walls and of a video camera for monitoring a desired region around the house. In particular, the camera has the following functions:

illumination of paths, triggered by an installed motion sensor or on request by means of a smartphone app;

illumination using ambient light (indirect illumination on the wall above and below the camera device);

recording of videos of scenes, triggered by movement, or a live transmission on demand;

an adjustable video head in the lamp;

a Wi-Fi-assisted wireless connection for data communication;

an installed voltage supply, e.g. a 230 V supply, for example for connection with an available light plug;

integrated loudspeaker and microphone; and an intercom function in order to speak with, or hear, persons in front of the camera.

The invention describes a video camera which makes available certain software features, which may either be carried out in an individual product (standalone product) or in combination with a control unit or a superordinate system (master system).

In accordance with the invention, the camera device is put into operation as follows:

In order to join a wireless network, an appliance must be supplied with suitable log on data (Wi-Fi, SSID and password) and logged onto (or authorized on) a superordinate system (backend (cloud) system). To this end, the camera device provides a mechanism, which operates as follows:

After a boot-up of the camera (when the latter is switched on), there is a defined time interval during which a QR code placed in front of the camera may be identified by the camera software. The QR code contains the necessary log on data in order to join the wireless network and identifies the camera device as belonging to a specific user. Optionally, the QR code also contains information preventing unauthorized access to a local camera and an ID number, by means of which the camera may be identified uniquely in the local network. The QR code also contains app-generated random patterns which protect the camera from an unauthorized configuration access during these steps during the startup or at a subsequent time. After a QR code has been successfully scanned, the camera device uses the access data which were made available to attempt to join, and ultimately actually join, the wireless network. If this is successful, the camera device registers itself with the backend under the account of the user. At this time, QR code scanning is switched off, either until the next boot-up or until the camera has lost the Wi-Fi connection (see 2.).

If the camera loses the connection to a previously available Wi-Fi network, the QR code scanning mechanism is automatically reactivated. However, at this time, the camera only accepts QR codes containing the specific authorization code transmitted to the camera in step 1.). This prevents an unauthorized user from being able to force a reboot and modify the Wi-Fi access data as desired. In order to facilitate the user being able to change the access data from various appliances, the cloud may store the authorization code and make it available to any app which wishes to produce a QR code.

As explained above, it is optionally also possible to trigger QR code scanning in the case of an existing connection and/or to regularly change the code in order to increase security.

In accordance with the invention, an event is produced by means of a motion detector (in particular a PIR motion detector) and a program-technical motion detection. The camera device comprises methods for identifying movements, namely a motion sensor (e.g. PIR sensor) and a program-technical (software) motion detection by means of video (image data) content analysis. An advantage of this mechanism is that the camera may be activated by the motion sensor, a light source may be switched on and a video recording may be started, even in the case of darkness. Prior to this, it is possible to check—on the basis of the content-based motion detection—whether the detection is real or relevant. By way of example, a check is carried out as to whether it was not a tree which triggered the movement alarm. Recording may then be started thereafter. Alternatively, a sensitivity range which is immune to pets may be created as a further example. The video algorithm could identify pets as opposed to humans and therefore avoid false alarms. The PIR detection and software detection may be used in any combination in order to improve the detection probabilities of alarms in respect of intruders or simply in order to improve the light functions. Each of the sensors may also be switched on or off individually.

Another feature lies in a user being able to produce a schedule by means of a smartphone app, said schedule being programmed into the camera device or the camera in order to control the light function without a user intervention or a movement which e.g. occurs at a door. This automatically controlled illumination may be planned by the user in such a manner as to feign house occupancy and scare off potential intruders.

A dimming function also arises in accordance with the invention. It is possible to dim the light through software control. Either the ambient light (second light source) and/or the direct light (first light source) may be dimmed, e.g. by means of a smartphone app. In addition to the use of schedules, the configuration may also include the ambient light sensor of the camera for determining switching on and off times. This allows a camera to adjust to changes in the times of sunrise and sunset and removes the necessity for the user to change the configuration throughout the course of a year. Adding the current readout value of the light sensor to a configuration screen of an app assists the user in setting the correct light level at any time of day.

BRIEF DESCRIPTION OF THE DRAWINGS

Further features, effects and advantages of the invention emerge from the following description of a preferred exemplary embodiment of the invention, and from the attached figures. Here, respectively in a schematic diagram:

FIG. 2 shows a time sequence for logging onto the data network from FIG. 1.

DETAILED DESCRIPTION

Figure 1:
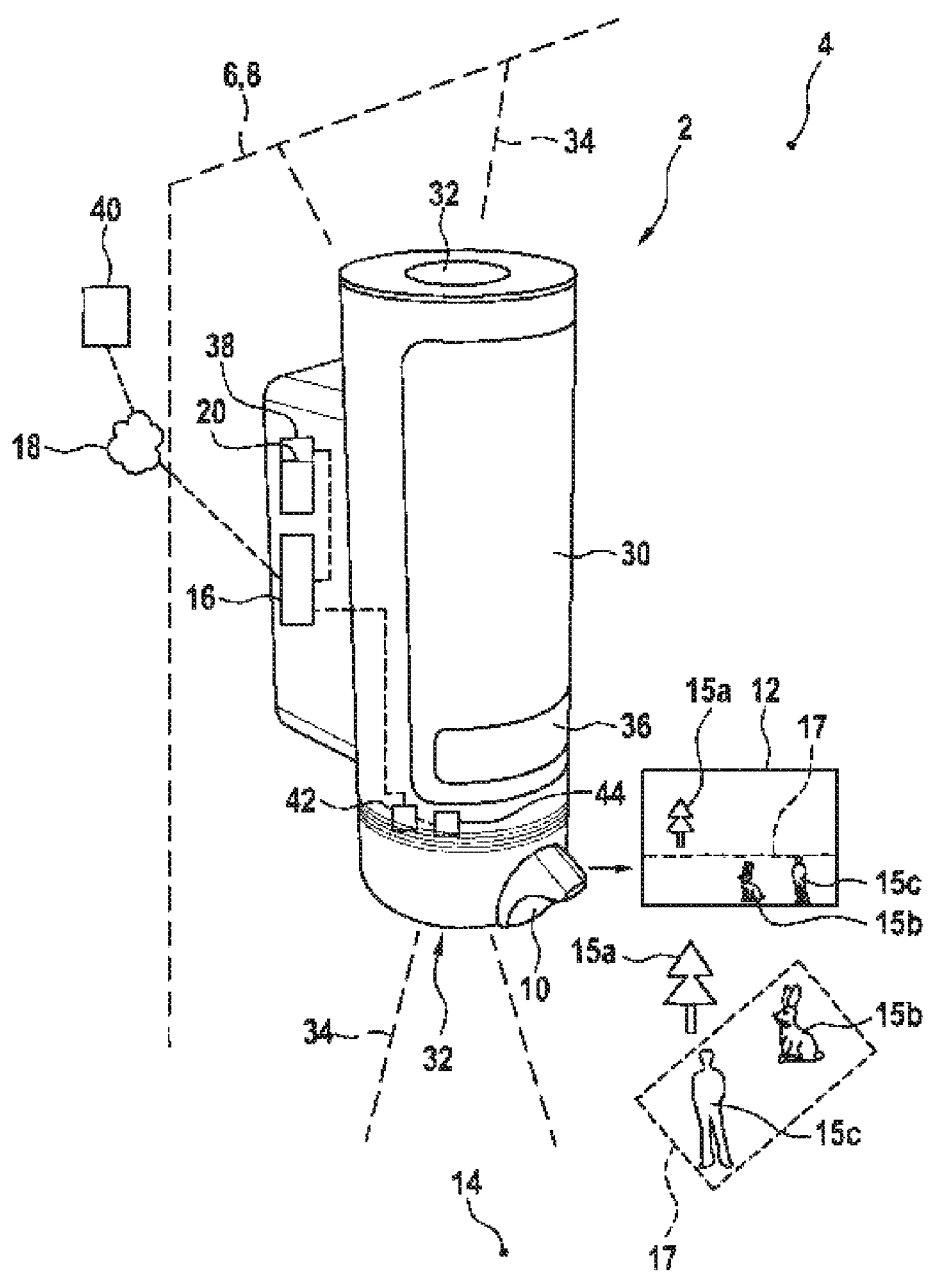
FIG. 1 shows a camera device in accordance with the invention.

FIG. 1 shows a camera device 2 for an exterior region 4 of a building 6, of which only a wall 8 is indicated. The camera device 2 is installed on an exterior side of the wall 8, and hence in the exterior region 4 of the building 6, at an intended installation position. The camera device 2 contains a camera 10 for producing image data 12 (depicted symbolically) of surroundings 14 of the camera device 2. The camera device 2 contains a network module 16, indicated symbolically, for connecting the camera device 2 to a data network 18, which is likewise symbolically indicated and is a Wi-Fi or WLAN here.

FIG. 2 shows a temporal sequence of the following events: the camera device 2 contains an evaluation module 20 (indicated symbolically) which is configured to detect a code pattern 22 in the image data 12 from a predetermined start time ts to an end time te if such a code pattern 22 is captured by the camera 10. In the example, the code pattern 22 is held in front of the camera 10. If a code pattern 22 was successfully recognized, the evaluation module 20 subsequently detects an authorization code 24 and access data 26 for the data network 18 in the code pattern 22. If an authorization code 24 and access data 26 were recognized, the detected authorization code 24 is checked in terms of the validity thereof. In the case of a valid authorization code 24, the camera device 2 is logged on to the data network 18 with the aid of the access data 26. The time of a successful log on is set as end time te.

By way of example, the start time ts is a time of a restart of the camera device 2.

However, the start time ts may also be the time of logging the camera device 2 off the data network 18. From such a start time ts, only the authorization code 24 which was transferred for the preceding log on to the data network 18 is accepted in a subsequent authorization procedure.

The camera device 2 contains a first light source 30 which serves to produce target illumination in the surroundings 14 of the camera device 2. A path not depicted in FIG. 1 is illuminated as a target, said path leading past the wall 8 of the building 6. The camera device 2 contains a second light source 32; a corresponding light source 32 is furthermore also situated at the lower side of the camera device, this not being visible in FIG. 1. The light source 32 serves to produce ambient lighting 34 in the surroundings 14 of the camera device 2. The ambient lighting 34 is merely indicated symbolically in the form of two light cones projected against the wall 8. Thus, the surroundings 14 are not illuminated directly by the light sources 32; instead, an optically appealing effect is obtained on the wall 8 as a result of the ambient lighting 34. The camera device 2 moreover contains a motion detector 36 for detecting a movement of an object (not depicted here) in the surroundings 14 of the camera device 2. The generation of image data 12 is started when a movement is detected.

The evaluation module 20 contains an interface 38 to a counterpart 40 in the form of a corresponding program. The connection to the counterpart 40 is brought about by way of the data network 18 along the symbolically depicted dashed line in FIG. 1. Here, the counterpart 40 is an app of a smartphone.

The camera device 2 moreover contains a loudspeaker 42 and a microphone 44, which are not visible in FIG. 1 as they are hidden behind a perforated grating in the interior of the depicted housing of the camera device 2 and are therefore merely indicated symbolically. In the camera device 2, an intercom function from the surroundings 14 to a counterpart 40 in the form of the corresponding program is brought about with the aid of the loudspeaker 42 and the microphone, as indicated symbolically by a dashed connection.

A total of three objects 15a-c are situated in the surroundings 14, namely a tree 15a, a rabbit 15b and a human 15c. All the objects 15a-c are moving. The motion detector 36 recognizes the movement of all three objects 15a-c. Thereupon, the camera 10 is activated and said camera starts recording or producing image data 12. The latter image the three objects 15a-c.

The evaluation module 20 is configured to detect the objects 15a-c in the image data by program-technical motion detection. Since the program-technical motion detection also identifies the movement of all three objects 15a-c, the movement detection by the movement detector 36 is validated. The latter therefore detected correctly.

However, now a classification of the objects 15a-c in the image data 12 is additionally carried out. In so doing, the object 15a is classified as a plant, the object 15b is classified as a small animal and the object 15c is classified as a human. Optionally, this is carried out only by way of the size of the objects 15a-c and not by way of integrated video analysis (IVA). Since plants are generally considered to be irrelevant by the evaluation module 20, the object 15a is classified as irrelevant. This does not lead to an alarm being triggered at the counterpart 40. However, small animals and humans are generally considered relevant by the evaluation module, and hence the objects 15b, c are initially classified as potentially relevant.

Now, further differentiation is carried out: the objects 15b, c are situated in a region 17 of the surroundings 14. This region 17 also corresponds to an image portion of the image data 12. Small animals are likewise considered irrelevant in this region as a so-called small-animal suppression is carried out. Thus, the object 15b likewise does not lead to an alarm being triggered at the counterpart 40. However, the human 15c is considered relevant even in the region 17. Since said human moves, an alarm is triggered at the counterpart 40. A user (not depicted here) can now observe the respectively current image data 12 transferred to the counterpart 40 at the latter. Moreover, the aforementioned intercom function facilitates communication with the human 15c.

A schedule for operating the first light source 30 and the second light source 32 is set in the evaluation module 20. Said schedule is introduced by the counterpart 40. The light sources 30, 32 are switched on and off according to this schedule. The operation of the light sources 30, 32 also depends on a brightness value of an ambient light in the surroundings 14, with the brightness value being ascertained by an ambient light sensor 46 in the camera 10.

Moreover, the light sources 30, 32 are dimmed by the evaluation module 20. The corresponding prescriptions are provided by the counterpart 40.

The invention claimed is:

1. A camera system for an exterior region of a building, the camera system comprising:
a video camera for producing image data of surroundings of the camera system,
a visible light source to illuminate the surroundings of the video camera for scaring off unauthorized persons,
an ambient light sensor, and
an electronic processor configured to carry out the following from a predetermined start time to an end time:
detect a code pattern in the image data,
detect an authorization code in the detected code pattern,
detect network log on access data for the data network in the detected code pattern, wherein the network log on access data includes a network password and at least one selected from the group consisting of a network identifier and a user identifier,
check the detected authorization code in respect of the validity thereof,
log the camera system onto the data network with the network log on access data in the case of a valid authorization code only in the time interval between the start time and the end time, and set a successful logon time as the end time, provide live transmissions of the surroundings of the exterior region to a counterpart, and
operate the visible light source for scaring off unauthorized persons depending on a brightness value from the ambient light sensor.

2. The camera system according to claim 1, wherein
the electronic processor is configured to set a restart time of the camera system as the start time.

3. The camera system according to claim 1, wherein
the electronic processor is configured to set a logoff time from a previously connected data network as the start time and, from the start time on, only to accept the authorization code which was transmitted for the preceding successful logon onto the data network.

4. The camera system according to claim 1, wherein
the visible light source is a first light source which serves to produce target lighting in the surroundings of the camera system for scaring off unauthorized persons, the camera system including a second light source which serves to produce ambient lighting in the surroundings of the camera system.

5. The camera system according to claim 1, wherein
the camera system contains a motion detector for detecting a movement of an object in the surroundings of the camera system.

6. The camera system according to claim 5, wherein
the electronic processor is configured to start producing image data in the case of a detection of a movement.

7. The camera system according to claim 1, wherein
the electronic processor contains an interface to the counterpart, wherein connection to the counterpart takes place via the data network.

8. The camera system according to claim 1, wherein
the camera system contains a loudspeaker, a microphone, or both.

9. The camera system according to claim 8, wherein
the electronic processor is configured to bring about an intercom function from the surroundings to the counterpart with the aid of the loudspeaker and the microphone.

10. A camera system for an exterior region of a building, the camera system comprising:
a loudspeaker, a microphone, or both,
a visible light source to produce target lighting in surroundings of the camera system for scaring off unauthorized persons,
an ambient light sensor,
a camera for producing image data of surroundings of the camera system, and
an electronic processor configured to
detect a code pattern in the image data,
detect an authorization code in the detected code pattern,
detect network log on access data for the data network in the detected code pattern, wherein the network log on access data includes a network password and at least one selected from the group consisting of a network identifier and a user identifier,
check the detected authorization code in respect of the validity thereof,
log the camera system onto the data network with the network log on access data in the case of a valid authorization code only in a time interval between a start time and an end time, and
operate the visible light source for scaring off unauthorized persons, depending on a brightness value from the ambient light sensor.

11. The camera system according to claim 10, wherein the electronic processor is configured to communicate with a counterpart via the data network, wherein the counterpart is a software application that is configured to communicate with the electronic processor to provide functionality associated with an intercom.

12. A camera system for an exterior region of a building, the camera system comprising:
a loudspeaker, a microphone, or both,
a visible light source to produce target lighting in surroundings of the camera system for scaring off unauthorized persons,
a camera for producing image data of surroundings of the camera system, and
an electronic processor configured to
detect a code pattern in the image data,
detect an authorization code in the detected code pattern,
detect network log on access data for the data network in the detected code pattern, wherein the network log on access data includes a network password and at least one selected from the group consisting of a network identifier and a user identifier,
check the detected authorization code in respect of the validity thereof,
log the camera system onto the data network with the network log on access data in the case of a valid authorization code only in a time interval between a start time and an end time, and
classify objects in the surroundings including a plant, a small animal, and a human.

13. The camera system according to claim 12, wherein the electronic processor is configured to determine that the object is relevant depending on a region of the surroundings in which the object is detected.

14. The camera system according to claim 10, wherein the camera is suitable for use and has a protection type of at least protection type IP44.

15. The camera system according to claim 1, wherein the electronic processor is configured to classify objects including a plant, a small animal, and a human.

16. The camera system according to claim 15, wherein the electronic processor is configured to determine that the object is relevant depending on a region of the surroundings in which the object is detected.

17. The camera system according to claim 16, wherein the electronic processor is configured to communicate with the counterpart via the data network, wherein the counterpart is a software application that is configured to receive an alarm when the detected object is relevant.

18. The camera system according to claim 1, wherein the video camera is suitable for use and has a protection type of at least protection type IP44.

19. The camera system according to claim 1, wherein the electronic processor is configured to classify objects including a plant.

20. The camera system according to claim 10, wherein the electronic processor is configured to classify objects including a plant.

* * * * *